United States Patent
Tsukizaki et al.

(10) Patent No.: US 10,160,348 B2
(45) Date of Patent: Dec. 25, 2018

(54) STARTING CONTROL DEVICE FOR ELECTRICALLY DRIVEN VEHICLE

(71) Applicant: Nissan Motor Co., Ltd., Yokohama-shi, Kanagawa (JP)

(72) Inventors: Atsushi Tsukizaki, Kanagawa (JP); Masato Koga, Kanagawa (JP); Hiroyuki Fukuda, Kanagawa (JP); Ryohey Toyota, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/571,521

(22) PCT Filed: Jun. 1, 2015

(86) PCT No.: PCT/JP2015/065776
§ 371 (c)(1),
(2) Date: Nov. 3, 2017

(87) PCT Pub. No.: WO2016/194105
PCT Pub. Date: Dec. 8, 2016

(65) Prior Publication Data
US 2018/0141464 A1    May 24, 2018

(51) Int. Cl.
*B60W 10/08*    (2006.01)
*B60L 15/20*    (2006.01)
(Continued)

(52) U.S. Cl.
CPC .......... *B60L 15/2054* (2013.01); *B60K 6/442* (2013.01); *B60K 6/547* (2013.01);
(Continued)

(58) Field of Classification Search
CPC ..................................................... B60W 10/08
See application file for complete search history.

(56) References Cited

U.S. PATENT DOCUMENTS

| 6,008,606 A | * | 12/1999 | Arai | ...................... B60W 20/40 |
|---|---|---|---|---|
| | | | | 318/431 |
| 2005/0040002 A1 | * | 2/2005 | Teraoka | .................. F16D 23/06 |
| | | | | 192/53.34 |

(Continued)

FOREIGN PATENT DOCUMENTS

| CN | 103419772 A | 12/2013 |
|---|---|---|
| CN | 103648874 A | 3/2014 |

(Continued)

*Primary Examiner* — Tisha D Lewis
(74) *Attorney, Agent, or Firm* — Global IP Counselors, LLP

(57) ABSTRACT

A starting control device is provided for an electrically driven vehicle having an electric motor and an internal combustion engine as drive sources and a transmission shifts and transmits an output of the electric motor to a drive wheel. The starting control device is configured to suppress an abrupt increase in the rotation of the electric motor at the time of an EV start of the vehicle from a released state of a starting dog clutch. In the electrically driven vehicle, an EV start is carried out by transmitting the output of the first motor/generator (MG1) to the drive wheel via a starting dog clutch that is meshingly engaged. The output of the first motor/generator is limited until the starting dog clutch comes into a meshed state in which the transmission transmits drive power at the time of start from a released state of the starting dog clutch.

19 Claims, 9 Drawing Sheets

(51) Int. Cl.
*B60K 6/442* (2007.10)
*B60K 6/547* (2007.10)
*B60W 20/13* (2016.01)
*B60W 10/02* (2006.01)
*B60W 50/032* (2012.01)
*B60W 10/11* (2012.01)
*B60W 30/18* (2012.01)
*B60W 20/30* (2016.01)
*B60W 20/50* (2016.01)
*B60W 50/029* (2012.01)

(52) U.S. Cl.
CPC ............ *B60L 15/20* (2013.01); *B60W 10/02* (2013.01); *B60W 10/08* (2013.01); *B60W 10/11* (2013.01); *B60W 20/13* (2016.01); *B60W 20/30* (2013.01); *B60W 20/50* (2013.01); *B60W 30/18027* (2013.01); *B60W 50/032* (2013.01); *B60W 2050/0297* (2013.01); *B60W 2540/16* (2013.01); *B60W 2710/086* (2013.01); *B60W 2710/1005* (2013.01); *B60Y 2200/91* (2013.01); *B60Y 2200/92* (2013.01); *B60Y 2400/421* (2013.01); *Y02T 10/6234* (2013.01); *Y02T 10/7275* (2013.01)

(56) References Cited

U.S. PATENT DOCUMENTS

2012/0259494 A1* 10/2012 Schaeffer ............... B60K 6/387
701/22
2014/0214293 A1 7/2014 Mori et al.

FOREIGN PATENT DOCUMENTS

| CN | 104192016 A | 12/2014 |
| CN | 104583035 A | 4/2015 |
| JP | 6-245329 A | 9/1994 |
| JP | 2000-142161 A | 5/2000 |
| JP | 2003-159967 A | 6/2003 |
| JP | 2006-46411 A | 2/2006 |
| JP | 2010-143384 A | 7/2010 |
| JP | 2012-66609 A | 4/2012 |
| JP | 2013-141938 A | 7/2013 |
| JP | 2014-105826 A | 6/2014 |
| JP | 2014-144666 A | 8/2014 |
| JP | 2015-58790 A | 3/2015 |
| WO | 2011/128538 A1 | 10/2011 |

\* cited by examiner

GEAR SHIFT PATTERN

| C2 | C3 | C1 | | |
|---|---|---|---|---|
| | | Left | N | Right |
| N | N | EV –<br>ICEgen | Neutral | EV –<br>ICE 3rd |
| | Left | EV 1st<br>ICE 1st | EV 1st<br>ICE – | EV 1st<br>ICE 3rd |
| | | Lock | EV 1st<br>ICE 2nd | Lock |
| Left | N | EV 1.5<br>ICE 2nd | EV –<br>ICE 2nd<br>(MG2 START) | Lock |
| | Right | Lock | EV 2nd<br>ICE 2nd | Lock |
| N | | EV 2nd<br>ICE 3rd' | EV 2nd<br>ICE – | EV 2nd<br>ICE 3rd |
| Right | | Lock | EV 2nd<br>ICE 4th | Lock |
| | N | EV 2.5<br>ICE 4th | EV –<br>ICE 4th | Lock |
| | Left | Lock | EV 1st<br>ICE 4th | Lock |

FIG. 4

STARTING CONTROL DEVICE FOR ELECTRICALLY DRIVEN VEHICLE

CROSS-REFERENCE TO RELATED APPLICATIONS

This application is a U.S. National stage application of International Application No. PCT/JP2015/065776, filed Jun. 1, 2015.

BACKGROUND

Field of the Invention

The present invention relates to a starting control device for an electrically driven vehicle comprising an electric motor and a transmission, where the transmission has a starting dog clutch that is meshing engaged by a stroke from a disengaged position.

Background Information

An example of a starting control device for an electrically driven vehicle comprising a transmission that has a starting dog clutch that is meshing engaged is disclosed in Japanese Laid-Open Patent Application No. Heisei 6-245329 (Patent Document 1). In the technique disclosed in Patent Document 1, drive power transmission loss at the time of travel is reduced with a simple configuration, by using a starting dog clutch that is meshing engaged.

SUMMARY

However, in a transmission having a clutch that is meshing engaged, there are cases in which the gears are not engaged, even if a shifting operation is carried out, due to a collision between the meshing teeth or the like. In such cases, if the output of the electric motor is controlled in accordance with a starting request of the vehicle, there is the risk of the electric motor rotating at high speed, so that the rotation of the electric motor will be raised abruptly while the clutch is not engaged.

In view of the problem described above, an object of the present invention is to provide a starting control device for an electrically driven vehicle that is configured to suppress a sudden rise in the rotation of the electric motor, at the time of an EV start of the vehicle from a released state of the starting dog clutch.

In order to achieve the object above, the electrically driven vehicle of the present invention comprises an electric motor and an internal combustion engine as power sources and a transmission that shifts and transmits the output of the electric motor to the drive wheels. The transmission does not have a differential rotation absorbing element between the internal combustion engine and the drive wheel, and has a starting dog clutch that is meshing engaged by a stroke from a disengaged position. The electrically driven vehicle is provided with a starting controller that carries out an EV start by transmitting the output of the electric motor to the drive wheels via the starting dog clutch, based on a starting request. The starting controller limits the output of the electric motor at the time of an EV start from a released state of the starting dog clutch, until the starting dog clutch is brought into a meshed state that is capable of the transmission of drive power.

Therefore, the output of the electric motor is limited at the time of an EV start from a released state of the starting dog clutch, until the starting dog clutch is brought into a meshed state that is capable of the transmission of drive power. That is, in a dog clutch, if the phases of the tips of the dog teeth (meshing teeth) are in agreement with each other, the dog teeth will collide with each other so the gears cannot be engaged. Consequently, there are cases in which the starting dog clutch will not be engaged, even when attempting to start the electrically driven vehicle according to a selection operation by the driver. In such cases, if the output of the electric motor is increased in accordance with the required driving force, there is the concern that the rotation of the electric motor will be abruptly raised. However, in the present invention, the output of the electric motor is limited until the starting dog clutch is brought into a meshed state that is capable of the transmission of drive power. As a result, it is possible to prevent a sudden rise in the rotation of the electric motor, at the time of an EV start from a released state of the starting dog clutch.

BRIEF DESCRIPTION OF THE DRAWINGS

Referring now to the drawings, a starting control device is illustrated.

FIG. 4 is a gear shift pattern table illustrating the gear shift patterns according to the switching positions of three engagement clutches in a multistage gear transmission mounted in a vehicle to which an embodiment of the starting control device is applied.

DETAILED DESCRIPTION OF THE EMBODIMENTS

Figure 1:
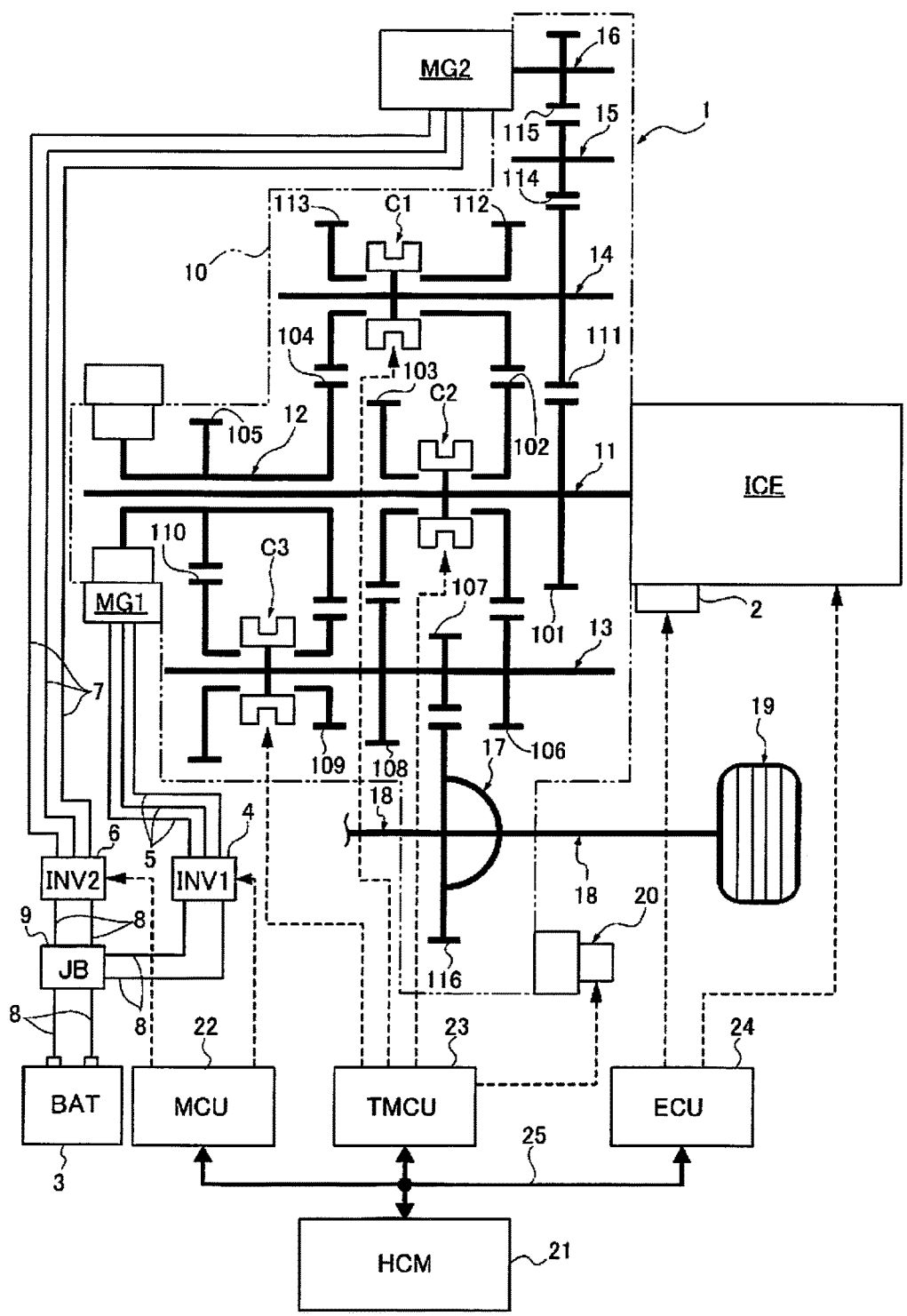
FIG. 1 is an overall system diagram illustrating a drive system and a control system of a vehicle to which an embodiment of the starting control device is applied.

A preferred embodiment for realizing the starting control device for an electrically driven vehicle of the present invention is described below based on the embodiment illustrated in the drawings.

The configuration is described first. The starting control device of the embodiment is applied to a hybrid vehicle (one example of an electrically driven vehicle) comprising, as drive system components, one engine, two motor/generators, and a multistage gear transmission having three engagement clutches. The "overall system configuration," the "configuration of the shift control system," the "configuration of the gear shift patterns," and the "configuration of the starting control process" will be described separately below, regarding the configuration of the starting control device for a hybrid vehicle in the embodiment.

Overall System Configuration

FIG. 1 illustrates a drive system and a control system of a vehicle (hybrid vehicle) to which is applied the starting control device of the embodiment. The overall system configuration will be described below, based on FIG. 1.

The drive system of the hybrid vehicle comprises an internal combustion engine ICE, a first motor/generator (electric motor, first electric motor) MG1, a second motor/generator (second electric motor) MG2, and a multistage gear transmission 1 having three engagement clutches C1, C2, C3, as illustrated in FIG. 1. Here, "ICE" is an acronym for "Internal Combustion Engine."

The internal combustion engine ICE is, for example, a gasoline engine or a diesel engine that is disposed in a front area of a vehicle such that the crankshaft direction is aligned with the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 remains available for when an MG2 start using a high-power battery 3 cannot be ensured, such as during extreme cold.

Both the first motor/generator MG1 and the second motor/generator MG2 are permanent magnet type synchronous motors utilizing three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated with a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated with a rotor of the second motor/generator MG2 is connected to a sixth shaft 16 of the multistage gear transmission 1. A first inverter 4, which converts direct current into three-phase alternating current during powering and converts three-phase alternating current into direct current during regeneration, is connected to a stator coil of the first motor/generator MG1, via a first AC harness 5. A second inverter 6, which converts direct current into three-phase alternating current during powering and converts three-phase alternating current into direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2 (abnormality starting dog clutch), and a third engagement clutch (starting dog clutch) C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed relative to the first shaft 11, in that order from the right in FIG. 1. The first gear 101 is integrally provided (including integral attachment) to the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch, C2.

The second shaft 12 is a shaft to which the first motor/generator MG1 is connected, and is a cylindrical shaft that is coaxially disposed with the axis aligned with the outer side position of the first shaft 11, and a fourth gear 104 and a fifth gear 105 are disposed relative to the second shaft 12, in that order from the right in FIG. 1. The fourth gear 104 and the fifth gear 105 are integrally provided (including integral attachment) to the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed relative to the third shaft 13, in that order from the right in FIG. 1. The sixth gear 106, the seventh gear 107, and the eighth gear 108 are integrally provided (including integral attachment) to the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 is a shaft in which both ends are supported on the transmission case 10, and an eleventh gear 111, a twelfth gear 112, and a thirteenth gear 113 are disposed relative to the fourth shaft 14, in that order from the right in FIG. 1. The eleventh gear 111 is integrally provided (including integral attachment) to the fourth shaft 14. The twelfth gear 112 and the thirteenth gear 113 are idling gears, in which a boss portion that protrudes in the axial direction is inserted into the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 is a shaft in which both ends are supported on the transmission case 10, and a fourteenth gear 114 that meshes with the eleventh gear 111 of the fourth shaft 14 is integrally provided thereto (including integral attachment).

The sixth shaft 16 is a shaft to which the second motor/generator MG2 is connected, and a fifteenth gear 115 that meshes with the fourteenth gear 114 of the fifth shaft 15 is integrally provided thereto (including integral attachment).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. The gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch that is interposed between the twelfth gear 112 and the thirteenth gear 113 of the fourth shaft 14, and that is engaged by an engagement stroke in a rotationally synchronized state without possessing a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 (abnormality starting dog clutch) is a dog clutch that is interposed between the second gear 102 and the third gear 103 of the first shaft 11, and that is engaged by an engagement stroke in a rotationally synchronized state without possessing a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 (starting dog clutch) is a dog clutch that is interposed between the ninth gear 109 and the tenth gear 110 of the third shaft 13, and that is engaged by an engagement stroke in a rotationally synchronized state without possessing a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral attachment) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means having a function to appropriately manage the energy consumption of the entire vehicle. This hybrid control module 21 is connected to the other control units (motor control unit 22, transmission control unit 23, engine control unit 24, etc.) so as to be capable of bidirectional information exchange via a CAN communication line 25. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2 via control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotation speed, with which the input-output rotational speeds of the clutch are synchronized, is determined, and an FB torque is output so as to bring the actual motor rotation speed to the target motor rotation speed, when there is a gear shift request to mesh and engage any one of the engagement clutches C1, C2, C3 during travel.

The transmission control unit 23 (acronym: "TMCU") carries out a shift control for switching the gear shift pattern of the multistage gear transmission 1, by outputting a current command to electric actuators 31, 32, 33 (refer to FIG. 2), based on predetermined input information. In this shift control, the engagement clutches C1, C2, C3 are selectively meshed-engaged/disengaged, and a gear pair involved in power transmission is selected from the plurality of pairs of gear pairs. Here, at the time of a gear shift request to engage any one of the released engagement clutches C1, C2, C3, in order to suppress differential rotation speed between the input-output of the clutch to ensure meshing and engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, spark plugs, fuel injection actuator, or the like, based on predetermined input information.

Configuration of the Shift Control System

The multistage gear transmission 1 according to the embodiment is characterized in that efficiency is achieved by reducing drag by employing, as shifting elements, engagement clutches C1, C2, C3 (dog clutch) that are meshing engaged. Then, when there is a gear shift request to mesh and engage any one of the engagement clutches C1, C2, C3, the differential rotation speeds of the input-output of the clutch are synchronized by the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement stroke is started once the torque becomes less than or equal to a release torque determination value, to realize the gear shift. The configuration of the shift control system of the multistage gear transmission 1 is described below based on FIG. 2.

Figure 2:
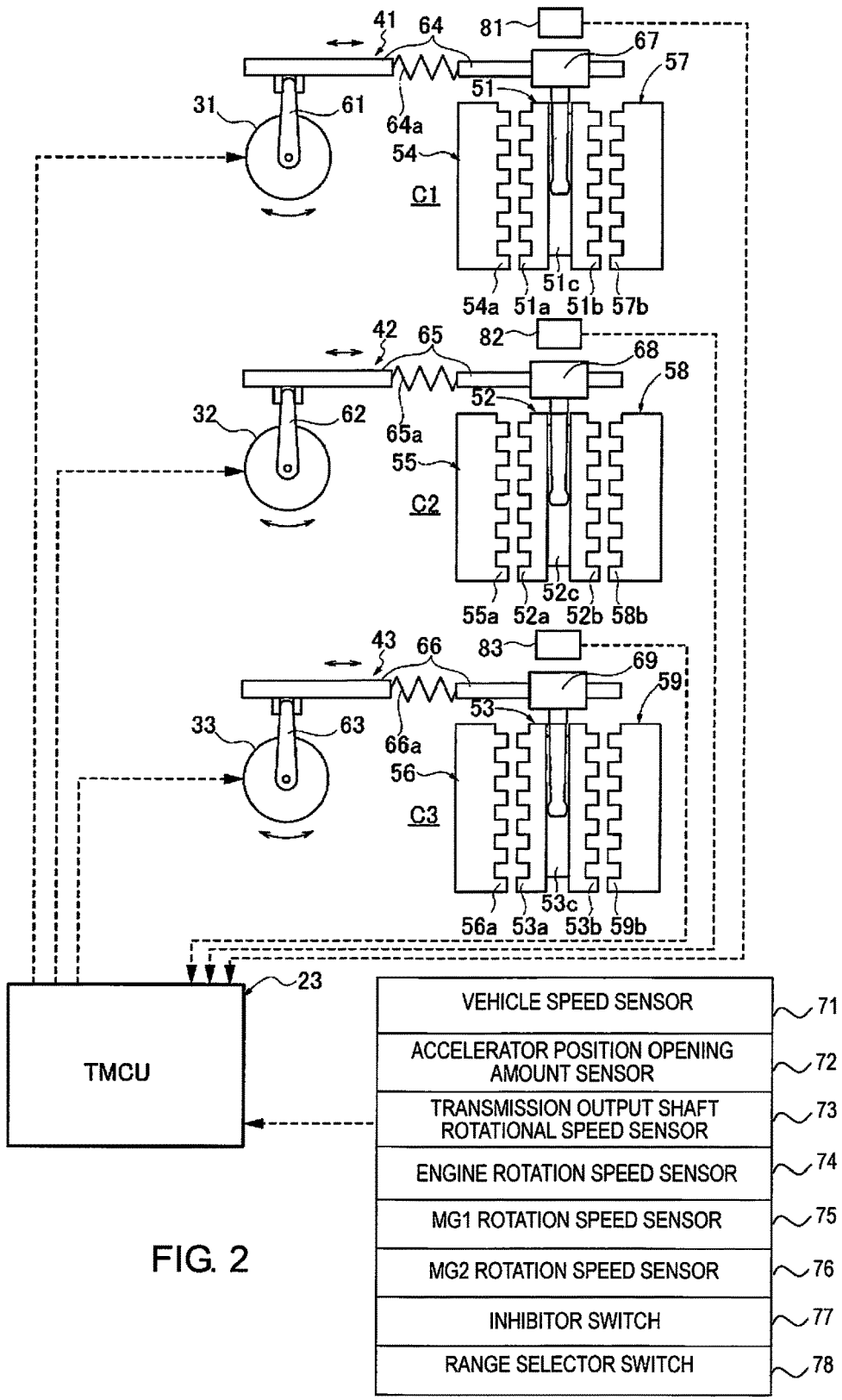
FIG. 2 is a control system block diagram illustrating the configuration of a shift control system of a multistage gear transmission mounted in a vehicle to which an embodiment of the starting control device is applied.

The shift control system comprises, as engagement clutches, a first engagement clutch C1, a second engagement clutch C2, and a third engagement clutch C3, as illustrated in FIG. 2. A first electric actuator 31, a second electric actuator 32, and a third electric actuator 33 are provided as actuators. A first engagement clutch operating mechanism 41, a second engagement clutch operating mechanism 42, and a third engagement clutch operating mechanism 43 are provided as mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing-engagement position), and a right engagement position (Right: right side clutch meshing-engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b, 52a, 52b, 53a, 53b on both sides having flat top surfaces. Furthermore, fork grooves 51c, 52c, 53c are provided relative to the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3, and have dog teeth 54a, 55a, 56a with flat top surfaces that oppose the dog teeth 51a, 52a, 53a. The right dog clutch rings 57, 58, 59 are fixed to the boss portions of the gears 112, 102, 109, which are right idling gears of the engagement clutches C1, C2, C3, and have dog teeth 57b, 58b, 59b with flat top surfaces that oppose the dog teeth 51b, 52b, 53b.

The first engagement clutch operating mechanism 41, the second engagement clutch operating mechanism 42, and the third engagement clutch operating mechanism 43 are mechanisms for converting the turning motions of the electric actuators 31, 32, 33 into axial stroke motions of the coupling sleeves 51, 52, 53. The engagement clutch operating mechanisms 41, 42, 43 all have the same configuration, comprising turning links 61, 62, 63, shift rods 64, 65, 66, and shift forks 67, 68, 69. One end of each of the turning links 61, 62, 63 is provided relative to the actuator shaft of the electric actuators 31, 32, 33, respectively, and each of the other ends is connected to the shift rods 64, 65, 66, respectively, so as to be relatively displaceable. The shift rods 64, 65, 66 are configured to be capable of expanding and contracting as a function of the magnitude and direction of the rod transmitting force by means of springs 64a, 65a, 66a interposed in the rod dividing positions. One end of each of the shift forks 67, 68, 69 is fixed to the shift rods 64, 65, 66, respectively, and each of the other ends are respectively disposed in the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotation speed sensor 73, an engine rotation speed sensor 74, an MG1 rotation speed sensor 75, an MG2 rotation speed sensor 76, an inhibitor switch 77, a range selector switch 78, and the like. The transmission output shaft rotation speed sensor 73 is provided relative to the shaft end portion of the third shaft 13 and detects the shaft rotation speed of the third shaft 13. Then, a position servo control unit (for example, a position servo system by PID control) is provided, which controls meshing-engagement and disengagement of the engagement clutches C1, C2, C3, determined by the positions of the coupling sleeves 51, 52, 53. The position servo control unit inputs sensor signals from a first sleeve position sensor 81, a second sleeve position sensor 82, and a third sleeve position sensor 83. Then, the sensor values of the sleeve position sensors 81, 82, 83 are read, and a current is imparted to the electric actuators 31, 32, 33 such that the positions of the coupling sleeves 51, 52, 53 will be in the disengaged position or the engagement position according to an engagement stroke. That is, by setting an engaged state in which the dog teeth welded to the coupling sleeves 51, 52, 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacement of the coupling sleeves 51, 52, 53 in the axial direction, the idling gears are disconnected from the fourth shaft 14, the first shaft 11, and the third shaft 13.

Configuration of the Gear Shift Pattern

The multistage gear transmission 1 of the first embodiment features size reduction achieved by reducing the power transmission loss without a differential rotation absorbing element, such as a fluid coupling, and by reducing ICE gear shift stages (gear shift stages of the internal combustion engine ICE) by providing a motor assist to the internal combustion engine ICE (EV gear shift stages: 1-2 speed, ICE gear shift stages: 1-4 speed). The configuration of the gear shift pattern of the multistage gear transmission 1 is described below based on FIG. 3 and FIG. 4.

Figure 3:
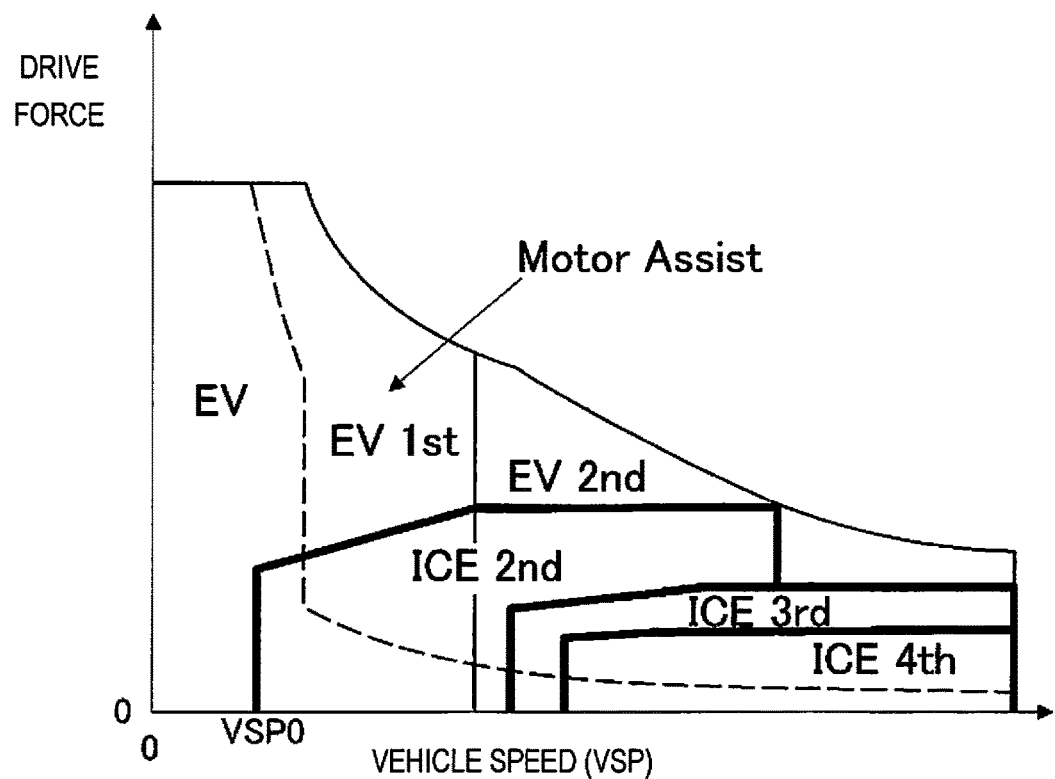
FIG. 3 is a schematic overview of a shift map illustrating a concept of switching the gear shift pattern in a multistage gear transmission mounted in a vehicle to which an embodiment of the starting control device is applied.

A gear shift pattern concept is employed in which, when the vehicle speed VSP is in a starting region that is less than or equal to a predetermined vehicle speed VSP0, since the multistage gear transmission 1 does not have a differential rotation absorbing element, a motor start by only the motor driving force is carried out in the "EV mode" (more precisely, EV1st, which is the first speed of the EV gear shift stage), as illustrated in FIG. 3. Then, when in the travel region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE1st) →ICE2nd→ICE3rd→ICE4th, and the EV gear shift stages (gear shift stages of the first motor/generator MG1) shift from EV1st→EV2nd. Therefore, based on the concept of the gear shift pattern illustrated in FIG. 3, a shift map for issuing gear shift requests for switching the gear shift pattern is created.

The gear shift patterns obtainable by the multistage gear transmission 1 having engagement clutches C1, C2, C3 are as shown in FIG. 4. In FIG. 4, "Lock" represents an interlock pattern that is not applicable to a gear shift pattern; "EV-" represents a state in which the first motor/generator MG1 is not drivingly connected to the drive wheels 19; and "ICE-" represents a state in which the internal combustion engine ICE is not drivingly connected to the drive wheels 19. During the shift control, it is not necessary to use all the gear shift patterns shown in FIG. 4, and it is, of course, possible to select from these gear shift patterns according to need. Each of the gear shift patterns is described below.

When the second engagement clutch C2 is in the "N" position and the third engagement clutch C3 is in the "N" position, the following gear shift patterns are obtained as a function of the position of the first engagement clutch C1. "EV-ICEgen" is obtained if the first engagement clutch C1 is in the "Left" position, "Neutral" is obtained if the first engagement clutch C1 is in the "N" position, and "EV-ICE3rd" is obtained if the first engagement clutch C1 is in the "Right" position. Here, the gear shift pattern "EV-ICEgen" is a pattern selected at the time of MG1 idle power generation, in which power is generated in the first motor/generator MG1 by the internal combustion engine ICE when the vehicle is stopped, or at the time of double idle power generation, in which MG2 power generation is carried out in addition to MG1 power generation. The gear shift pattern "Neutral" is a pattern selected at the time of MG2 idle power generation, in which power is generated in the second motor/generator MG2 by the internal combustion engine ICE when the vehicle is stopped.

When the second engagement clutch C2 is in the "N" position and the third engagement clutch C3 is in the "Left" position, the following gear shift patterns are obtained as a function of the position of the first engagement clutch C1. "EV1st ICE1st" is obtained if the first engagement clutch C1 is in the "Left" position, "EV1st ICE-" is obtained if the first engagement clutch C1 is in the "N" position, and "EV1st ICE3rd" is obtained if the first engagement clutch C1 is in the "Right" position. Here, the gear shift pattern "EV1st ICE-" is an "EV mode" pattern, in which the internal combustion engine ICE is stopped and travel is carried out by the first motor/generator MG1, or a "series HEV mode" pattern, in which first-speed EV travel is carried out by the first motor/generator MG1 while power is generated in the second motor/generator MG2 by the internal combustion engine ICE. When traveling in the "series HEV mode" while selecting "EV1st ICE-" the first engagement clutch C1 is switched from the "N" position to the "Left" position based on a deceleration due to insufficient driving force. In this case, the vehicle transitions to traveling by a "parallel HEV mode (first speed)" according to the "EV1st ICE1st" gear shift pattern, in which the driving force is secured.

When the second engagement clutch C2 is in the "Left" position and the third engagement clutch C3 is in the "Left" position, "EV1st ICE2nd" is obtained if the first engagement clutch C1 is in the "N" position. For example, if the driving force requirement is increased during first-speed EV travel while selecting the "series HEV mode" by "EV1st ICE-," the second engagement clutch C2 is switched from the "N" to the "Left" position. In this case, the vehicle transitions to travel by a "parallel HEV mode" according to the "EV1st ICE2nd" gear shift pattern, in which the driving force is secured.

When the second engagement clutch C2 is in the "Left" position and the third engagement clutch C3 is in the "N" position, the following gear shift patterns are obtained as a function of the position of the first engagement clutch C1. "EV1.5 ICE2nd" is obtained if the first engagement clutch C1 is in the "Left" position, and "EV-ICE2nd" is obtained if the first engagement clutch C1 is in the "N" position. Here, the gear shift pattern "EV-ICE2nd" is a pattern selected at a time when second-speed engine travel is carried out by the internal combustion engine ICE with the first motor/generator MG1 stopped, or at a time when an abnormality is detected in the first motor/generator MG1 and the vehicle is started by only the second motor/generator MG2 (at the time of starting by the "MG2 start mode" described below).

When the second engagement clutch C2 is in the "Left" position and the third engagement clutch C3 is in the "Right" position, "EV2nd ICE2nd" is obtained if the first engagement clutch C1 is in the "N" position. For example, when traveling in the "parallel HEV mode" while selecting the "EV1st ICE2nd" gear shift pattern, the third engagement clutch C3 is switched from the "Left" position to the "Right" position via the "N" position, according to an up-shift request. In this case, the vehicle transitions to traveling by the "parallel HEV mode" according to the "EV2nd ICE2nd" gear shift pattern, in which the EV gear shift stage is set to second speed. For example, when traveling in the "parallel HEV mode" while selecting the "EV2nd ICE4th" gear shift pattern, the second engagement clutch C2 is switched from the "Right" position to the "Left" position via the "N" position, according to a downshift request. In this case, the vehicle transitions to traveling by the "parallel HEV mode" according to the "EV2nd ICE2nd" gear shift pattern, in which the ICE gear shift stage is set to second speed.

When the second engagement clutch C2 is in the "N" position and the third engagement clutch C3 is in the "Right" position, the following gear shift patterns are obtained as a function of the position of the first engagement clutch C1. "EV2nd ICE3rd'" is obtained if the first engagement clutch C1 is in the "Left" position, "EV2nd ICE-" is obtained if the first engagement clutch C1 is in the "N" position, and "EV2nd ICE3rd" is obtained if the first engagement clutch C1 is in the "Right" position. Here, the gear shift pattern "EV2nd ICE-" is an "EV mode" pattern, in which the internal combustion engine ICE is stopped and traveling is carried out by the first motor/generator MG1, or a "series HEV mode" pattern, in which a second-speed EV traveling is carried out by the first motor/generator MG1 while power is generated in the second motor/generator MG2 by the internal combustion engine ICE. For example, when traveling in the "parallel HEV mode" while selecting the "EV2nd ICE2nd" gear shift pattern, the second engagement clutch C2 is switched from the "Left" position to the "N" position, and the first engagement clutch C1 is switched from the "N" position to the "Right" position, according to an up-shift request. In this case, the vehicle is caused to transition to traveling by the "parallel HEY mode" according to the "EV2nd ICE3rd" gear shift pattern, in which the ICE gear shift stage is set to third speed.

When the second engagement clutch C2 is in the "Right" position and the third engagement clutch C3 is in the "Right" position, "EV2nd ICE4th" is obtained if the first engagement clutch C1 is in the "N" position.

When the second engagement clutch C2 is in the "Right" position and the third engagement clutch C3 is in the "N" position, the following gear shift patterns are obtained as a function of the position of the first engagement clutch C1. "EV2.5 ICE4th" is obtained if the first engagement clutch C1 is in the "Left" position, and "EV-ICE4th" is obtained if the first engagement clutch C1 is in the "N" position.

When the second engagement clutch C2 is in the "Right" position and the third engagement clutch C3 is in the "Left" position, "EV1st ICE4th" is obtained if the first engagement clutch C1 is in the "N" position.

Configuration of the Starting Control Process

Figure 5:
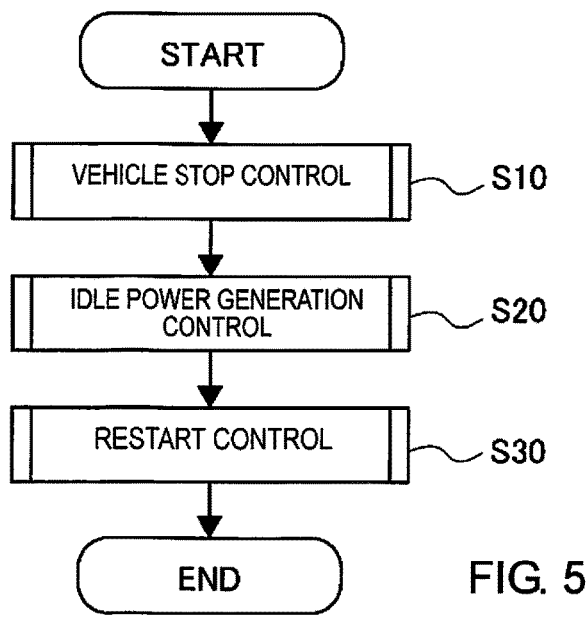
FIG. 5 is a flowchart illustrating the sequence of starting control steps carried out in a transmission control unit of the embodiment.
Figure 6:
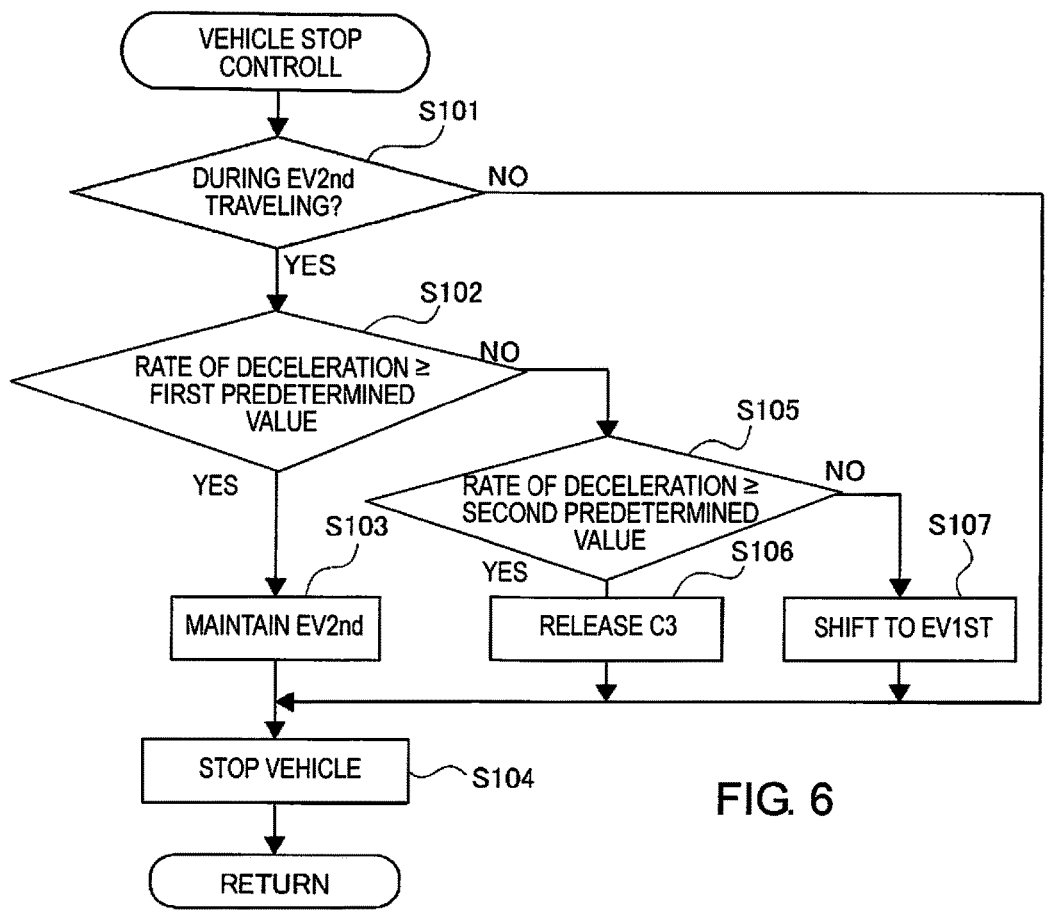
FIG. 6 is a subroutine flowchart illustrating the vehicle stop control steps in the flowchart of FIG. 5.
Figure 7:
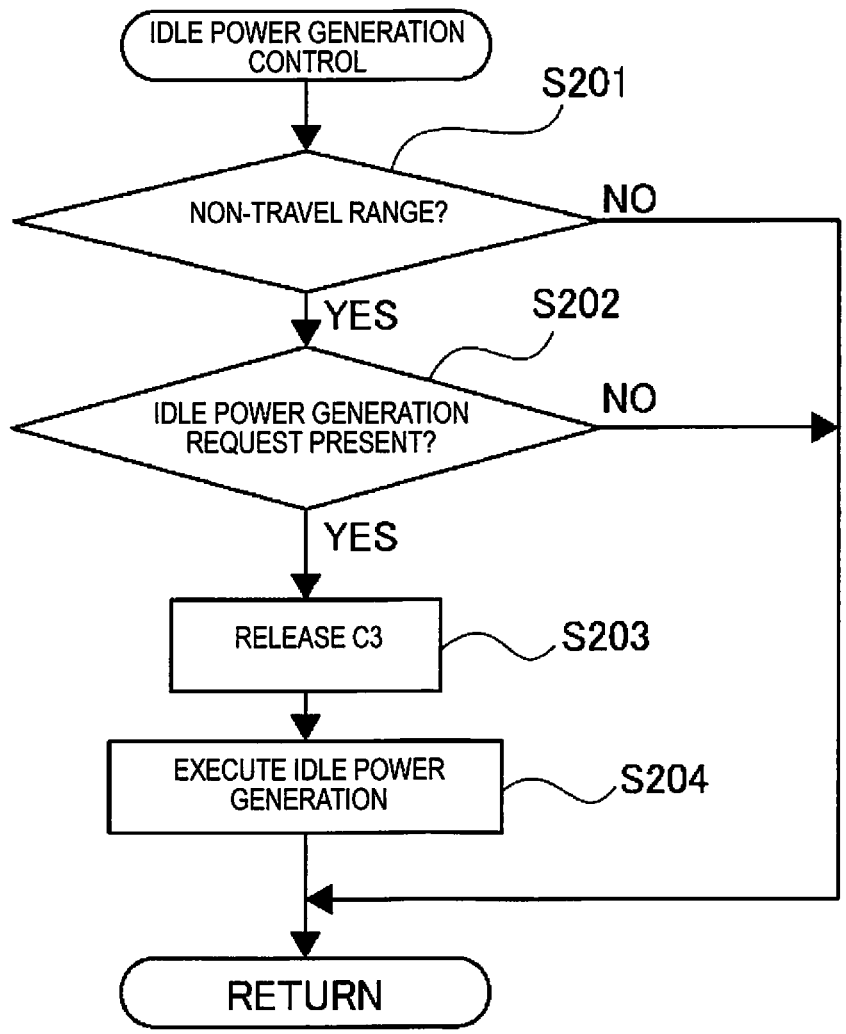
FIG. 7 is a subroutine flowchart illustrating the idle power generation control steps in the flowchart of FIG. 5.
Figure 8:
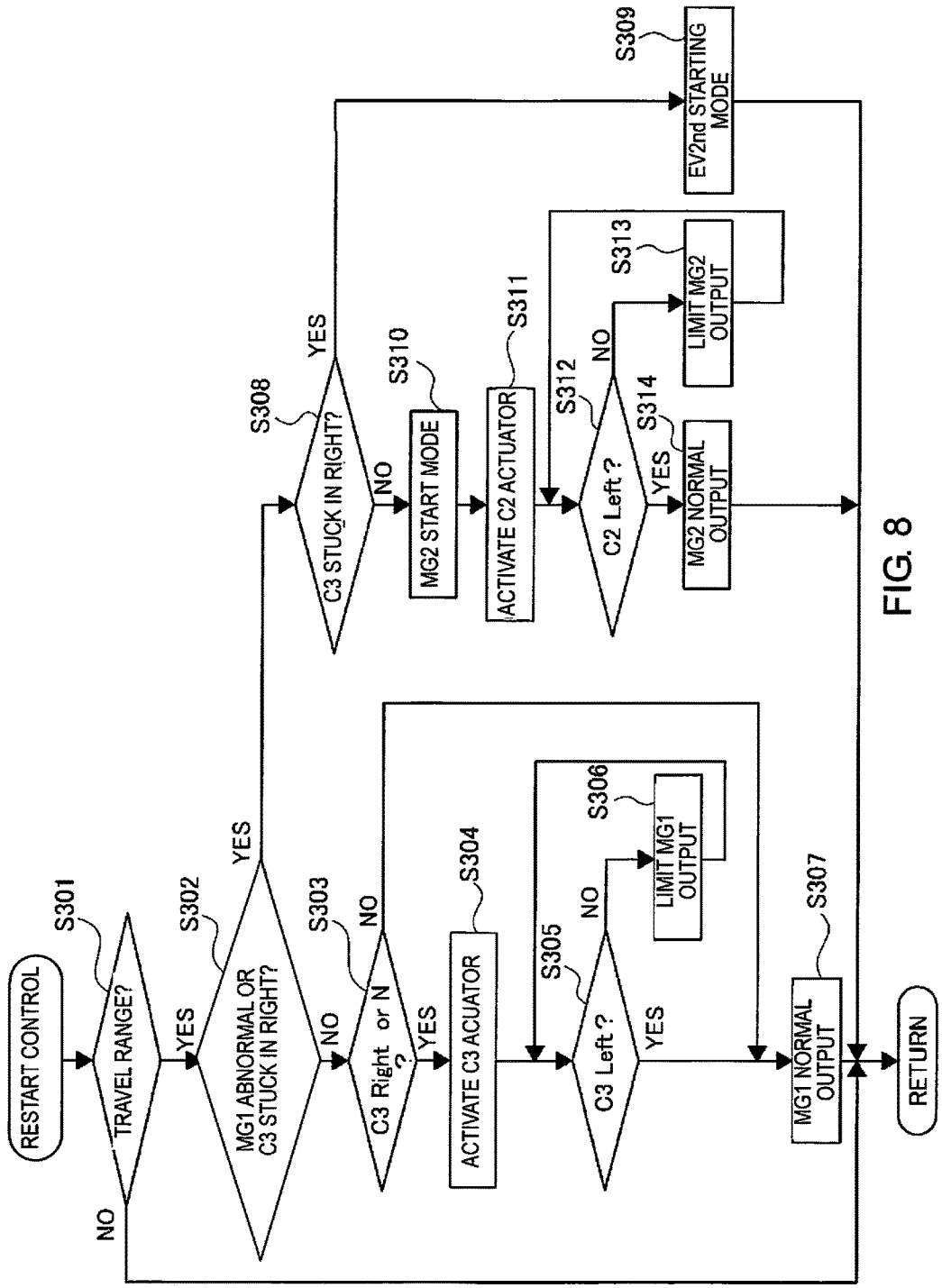
FIG. 8 is a subroutine flowchart illustrating the restart control steps in the flowchart of FIG. 5.

FIG. 5 is the main flowchart illustrating the sequence of starting control steps carried out in the transmission control unit 23 (starting controller) of the embodiment. In addition, FIGS. 6 to 8 are subroutine flowcharts more specifically illustrating the respective sets of steps in the flowchart of FIG. 5. Each of the sets of steps showing one example of the configuration of the starting control steps will be described below. The steps illustrated in the flowchart of FIG. 5 are initiated when there is a deceleration request from the vehicle.

First, the transmission control unit 23 executes a vehicle stop control in Step S10. FIG. 6 is a subroutine flowchart illustrating the vehicle stop control.

In Step S101, it is determined whether or not the vehicle is traveling in EV2nd. As shown in the gear shift pattern table of FIG. 4, EV2nd indicates a case in which the third engagement clutch C3 is in the "Right" position.

The determination of Step S101 is determined on the basis of whether or not the EV gear shift stage is in second speed, regardless of the gear shift stage of the internal combustion engine ICE. If the EV gear shift stage is in second speed, it is preferable to shift the EV gear shift stage to first speed during deceleration travel for the restart control. In order to downshift (downshift) the EV gear shift stage from second speed to first speed, it is necessary to switch the third engagement clutch C3 from the "Right" position to the "Left" position via the "N" position.

Therefore, if the determination of Step S101 is YES (EV gear shift stage is second speed), the steps proceed to Step S102, and it is determined whether or not the rate of deceleration of the vehicle is greater than or equal to a first predetermined value. The first predetermined value is a value that is determined on the basis of the current vehicle speed, and is set to a value with which it is possible to determine that even a time to switch the third engagement clutch C3 from the "Right" position to the "N" position cannot be secured. In other words, the first predetermined value is set to a value with which it is possible to determine whether or not to stop the vehicle by a rapid deceleration. If the determination of Step S101 is NO (EV gear shift stage is first speed), since it is not necessary to downshift, the subsequent steps are skipped and the vehicle is stopped.

If the determination of Step S102 is YES (rate of deceleration≥first predetermined value), that is, if it is determined that the vehicle is decelerating rapidly, the steps proceed to Step S103, and the vehicle is stopped while maintaining EV2nd without carrying out a EV downshift (Step S104).

On the other hand, if the determination of Step S102 is NO (rate of deceleration<first predetermined value), the steps proceed to Step S105, and it is determined whether or not the rate of deceleration of the vehicle is greater than or equal to a second predetermined value. Here, the second predetermined value is a value that is determined on the basis of the current vehicle speed, and is set to a value that is smaller than the first predetermined value. Specifically, the second predetermined value is set to a value with which it is possible to determine whether or not there is enough time to complete an EV shifting operation (EV downshift).

In other words, the second predetermined value is set to a value with which it is possible to determine whether or not to stop the vehicle by a gradual deceleration.

If the determination of Step S105 is YES (second predetermined value≤rate of deceleration<first predetermined value), that is, if it is determined that the vehicle is not rapidly decelerating but that there is not enough time to complete an EV downshift, the steps proceed to Step S106, the third engagement clutch C3 is switched from the "Right" position to the "N" position, and the vehicle is stopped while maintaining this state (Step S104).

On the other hand, if the determination of Step S105 is NO (rate of deceleration<second predetermined value), that is, if it is determined that the vehicle is gradually decelerating and that an EV downshift can be completed, the steps proceed to Step S107, and the EV gear shift stage is shifted to first speed. More specifically, the third engagement clutch C3 is switched from the "Right" position to the "Left" position via the "N" position, and the vehicle is stopped (Step S104).

When the vehicle is stopped, the steps return to the main flowchart of FIG. 5 from the subroutine flowchart of FIG. 6. The present control is ended, and the steps also return to the main flowchart of FIG. 5 when there is a re-acceleration request during the vehicle deceleration.

Again, with reference to FIG. 5 in continuation of the description, the program then proceeds to Step S20 and an idle power generation control is carried out. FIG. 7 is a subroutine flowchart illustrating the idle power generation control.

As described below, in Step S201, it is determined whether or not a non-travel range (P, N) has been selected by the driver. This determination is carried out based on a signal from the range selector switch 78. The transmission control unit 23 according to the present embodiment is configured to switch all of the first, second, and third engagement clutches C1, C2, C3 to the "N" position when a non-travel range (P, N) is selected by the driver.

If the determination of Step S201 is NO (travel range (R, D, etc.) selected), an idle power generation control is not carried out, and the steps return to the main flowchart of FIG. 5. On the other hand, if the determination of Step S201 is YES (non-travel range (P, N) selected), the steps proceed to Step S202, and it is determined whether or not there is an idle power generation request. The presence/absence of an idle power generation request is determined on the basis of a signal from a switch (not shown) that can be operated by the driver, the remaining battery SOC (State of Charge) of the high-power battery 3, and the like.

If the determination of Step S202 is NO (idle power generation request absent), an idle power generation control is not carried out, and the steps return to the main flowchart. On the other hand, if the determination of Step S202 is YES (idle power generation request present), the steps proceed to Step S203, the second and third engagement clutches C2, C3 are switched to the "N" position, and the first engagement clutch C1 is switched to the "Left" position (the gear shift pattern of the multistage gear transmission 1 is set to "EV-ICEgen"). The reason for releasing the second engagement clutches C2, C3 at the time of idle power generation is to prevent the vehicle from starting to move due to the rotation of the internal combustion engine ICE while the vehicle is stopped.

The steps then proceed to Step S204 and an idle power generation control is carried out. The idle power generation control is ended when a request from the driver is no longer present, when it is determined that the remaining battery SOC of the high-power battery 3 is sufficiently high, or when a travel range (D, R) is selected by the driver. When the idle power generation control is ended, the program returns to the main flowchart of FIG. 5.

Again, with reference to FIG. 5 in continuation of the description, the program then proceeds to Step S30 and a restart control is carried out. FIG. 8 is a subroutine flowchart illustrating the restart control.

As described below, in Step S301, it is determined whether or not a travel range (D, R, etc.) has been selected by the driver, that is, whether or not there is a restart request. This determination is carried out based on a signal from a range selector switch 78.

If the determination of Step S301 is NO (non-travel range (P, N) selected), since it is not necessary to execute a restart control, the following steps are skipped and the steps return to the main flowchart of FIG. 5. On the other hand, if the determination of Step S301 is YES (travel range (D, R, etc.) selected), the steps proceed to Step S302, and it is determined whether or not an abnormality that hinders a normal restart control is occurring. Specifically, it is determined whether or not an abnormality has occurred in the first motor/generator MG1, or whether or not the third engagement clutch C3 is stuck in the "N" position or the "Right" position.

As described above, the electrically driven vehicle according to the present embodiment is configured to normally start only by the drive force of the first motor/generator MG1. Therefore, in Step S302, it is confirmed that there is no abnormality in the first motor/generator MG1. In addition, as described with reference to FIG. 4, since the gear shift pattern when starting by the first motor/generator MG1 is "EV1st ICE-" in the present embodiment, it is confirmed whether or not the first speed of the EV gear shift stage can be established, in other words, whether or not the third engagement clutch C3 is stuck in a position other than the "Left" position. The determination of Step S302 is determined on the basis of the temperature of the first motor/generator MG1 and the output of a stroke sensor (not shown) of the third engagement clutch C3.

If the determination of Step S302 is NO (the first motor/generator MG1 is normal, and the third engagement clutch C3 is not stuck in the "N" position or the "Right" position), the steps proceed to Step S303, and it is determined whether or not the current position of the third engagement clutch C3 is the "Right" position or the "N" position.

If the determination of Step S303 is YES (the third engagement clutch C3 is in a position other than the "Left" position), (if it is determined that the third engagement clutch C3 is engaged with a gear shift stage other than EV1st), the steps proceed to Step S304, and the third electric actuator 33 is operated to make the third engagement clutch C3 shift toward the "Left" position. Examples of cases in which the determination of Step S303 becomes YES include the case in which an EV downshift is not completed at the time of a vehicle stop, as described with reference to the flowchart of FIG. 6, and the case in which the third engagement clutch C3 is released by carrying out an idle power generation control, as described with reference to the flowchart of FIG. 7.

Next, in Step S305, it is determined whether or not the third engagement clutch C3 has been switched to the "Left" position. This determination is carried out based on an output of a stroke sensor (not shown) that detects the stroke amount of the third engagement clutch C3, and the determination of Step S305 becomes YES when the third engagement clutch C3 has moved to the stroke end.

If the determination of Step S305 is NO (the third engagement clutch C3 has not reached the "Left" position), that is, if it is determined that the third engagement clutch C3 has not been switched to the "Left" position, the steps proceed to Step S306, and the output of the first motor/generator MG1 is limited. Specifically, the output of the first motor/generator MG1 is limited such that the difference between the rotational speed of the dog teeth 53a of the coupling sleeve 53 of the third engagement clutch C3 and the rotational speed of the dog teeth 56a of the left dog clutch ring 56 (fixed to the tenth gear 110, which is rotated by the first motor/generator MG1), which is meshing engaged with the dog teeth 53a, will be less than or equal to a predetermined rotational speed at which the dog teeth (meshing teeth) 53a, 56a can be meshing engaged. The predetermined rotational speed is determined by experimentation, from the structure of each of the dog teeth 53a, 56a, the characteristics of the third electric actuator 33 that drives the coupling sleeve 53 of the third engagement clutch C3, and the like.

The instructions of Step S305 and Step S306 are repeatedly carried out until the determination of Step S305 becomes YES. That is, the output of the first motor/generator MG1 is limited until the third engagement clutch C3 is switched to the "Left" position.

If the determination of Step S305 becomes YES, that is, if it is determined that the gear shift pattern "EV1st" has been established, the steps proceed to Step S307, the output limitation of the first motor/generator MG1 is ended, and the vehicle is started with the output of the first motor/generator MG1 set to normal.

If the determination of Step S303 is NO, that is, if the current position of the third engagement clutch C3 is in the "Left" position from the beginning, the steps proceed to Step S307, and the vehicle is started while controlling the output of the first motor/generator MG1 as usual.

On the other hand, if the determination of Step S302 is YES (there is an abnormality in the first motor/generator MG1, or the third engagement clutch C3 is stuck in the "N" position or in the "Right" position), the steps proceed to Step S308, and it is determined whether or not the abnormality determined in Step S302 is an abnormality in which the third engagement clutch C3 is stuck in the "Right" position.

If the determination of Step S308 is YES (third engagement clutch C3 stuck in the "Right" position), the EV gear shift stage cannot be changed from the second speed. Therefore, in such a case, the steps proceed to Step S309, and the vehicle is switched to an EV2nd start mode. That is, the first and second engagement clutches C1, C2 are maintained in the "N" position, and the vehicle is EV started at second speed only by means of the drive force of the first motor/generator MG1.

On the other hand, if the determination of Step S308 is NO (there is an abnormality in the first motor/generator MG1, or the third engagement clutch C3 is stuck in the "N" position), the vehicle cannot be started using the first motor/generator MG1. Therefore, in such a case, the steps proceed to Step S310, and the gear shift pattern is switched to the "MG2 start mode" (abnormality EV start mode). Specifically, the second motor/generator MG2 is used to EV start the vehicle instead of the first motor/generator MG1. In this case, the second engagement clutch C2 functions as a starting dog clutch (abnormality starting dog clutch) instead of the third engagement clutch C3.

Therefore, in Step S311, the second electric actuator 32 is operated to shift the second engagement clutch C2 toward the "Left" position. At this time, the first engagement clutch C1 is switched to the "N" position.

Next, in Step S312, it is determined whether or not the second engagement clutch C2 has been switched to the "Left" position. This determination is carried out based on an output of a stroke sensor (not shown) that detects the stroke amount of the second engagement clutch C2, and the determination of Step S312 becomes YES when the second engagement clutch C2 has moved to the stroke end.

If the determination of Step S312 is NO (the second engagement clutch C2 has not reached the "Left" position), the steps proceed to Step S313, and the output of the second motor/generator MG2 is limited. Specifically, the output of the second motor/generator MG2 is limited such that the difference between the rotational speed of the dog teeth 52b of the coupling sleeve 52 (rotated by the second motor/generator MG2) of the second engagement clutch C2 and the rotational speed of the dog teeth 58b of the right dog clutch ring 58 (fixed to the second gear 102), which is meshing engaged with the dog teeth 52b, will be less than or equal to a predetermined rotational speed at which the dog teeth (meshing teeth) 52b, 58b can be meshing engaged. The predetermined rotational speed is determined by experimentation, from the structure of each of the dog teeth 52b, 58b, the characteristics of the second actuator 32 that drives the coupling sleeve 52 of the second engagement clutch C2, and the like.

The instructions of Step S312 and Step S313 are repeatedly carried out until the determination of Step S312 becomes YES. That is, the output of the second motor/generator MG2 is limited until the second engagement clutch C2 is switched to the "Left" position.

If the determination of Step S312 becomes YES, that is, if it is determined that an MG2 shifting mode (EV-ICE2nd) has been established, the steps proceed to Step S314, the output limitation of the second motor/generator MG2 is ended, and the vehicle is started with the output of the second motor/generator MG2 set to normal.

Once the starting of the vehicle is initiated, the program is ended.

Next, the actions are described. The "action of the starting control process," the "action of the starting control," and the "characteristic action of the starting control" will be described separately, regarding the actions of the starting control device for a hybrid vehicle according to the embodiment.

Action of the Starting Control Process

The action of the starting control process at the time of starting when the third engagement clutch (starting dog clutch) C3 is in a released state will be described below, based on the flowchart illustrated in FIG. 8.

If a travel range (D, R, etc.) is selected by the driver in a state in which the third engagement clutch C3 is in the "N" position, the steps proceed from Step S301→Step S302 in the flowchart of FIG. 8. If there is no abnormality in the first motor/generator MG1 and the third engagement clutch C3 is not stuck in the "N" position, the steps proceed from Step S303→Step S304. In Step S304, the third electric actuator 33, which operates the third engagement clutch C3 is driven. Next, the steps proceed to Step S305, and it is determined whether or not the third engagement clutch C3 has reached the "Left" position from the "N" position, that is, a position that establishes the EV mode "EV1st." As long as it is determined that the third engagement clutch C3 has not reached the "Left" position, the steps of Step S305→Step S306 are repeated, and the output of the first motor/generator MG1 for starting the vehicle is limited, regardless of the required driving force from the driver. In other words, the control to switch the third engagement clutch C3 to the "Left" position is prioritized over the starting control.

When it is determined that the third engagement clutch C3 has reached the "Left" position, the steps proceed to Step S307, the output limitation of the first motor/generator MG1 is canceled, and the output of the first motor/generator MG1 is controlled according to the required driving force from the driver as usual.

In addition, the action of the starting control process at the time of starting when the third engagement clutch (starting dog clutch) C3 is in the "Right" position will be described.

If a travel range (D, R, etc.) is selected by the driver in a state in which the third engagement clutch C3 is in the "Right" position, the steps proceed from Step S301→Step S302 in the flowchart of FIG. 8. If there is no abnormality in the first motor/generator MG1 and the third engagement clutch C3 is not stuck in the "Right" position, the steps proceed from Step S303→Step S304. In Step S304, the third electric actuator 33, which operates the third engagement clutch C3 is driven. Next, the steps proceed to Step S305, and it is determined whether or not the third engagement clutch C3 has reached the "Left" position from the "Right" position, that is, a position that establishes the EV mode "EV1st." As long as it is determined that the third engagement clutch C3 has not reached the "Left" position, the steps of Step S305→Step S306 are repeated, and the output of the first motor/generator MG1 for starting the vehicle is limited, regardless of a required driving force from the driver. In other words, the control to switch the third engagement clutch C3 to the "Left" position is prioritized over the starting control.

When it is determined that the third engagement clutch C3 has reached the "Left" position, the steps proceed to Step S307, and the output of the first motor/generator MG1 is normally controlled according to the required driving force from the driver, in the same manner as described above.

Next, the action of the starting control process for a case in which the third engagement clutch (starting dog clutch) C3 is stuck in the "N" position will be described.

If a travel range (D, R, etc.) is selected by the driver in a state in which the third engagement clutch C3 is stuck in the "N" position, the steps proceed from Step S301→Step S302→Step S308→Step S310, in the flowchart of FIG. 8. In Step S310, the start mode "MG2 start mode" by the second motor/generator MG2 is selected, and the steps proceed to Step S311 to drive the second electric actuator 32, which operates the second engagement clutch C2. Next, the steps proceed to Step S312, and it is determined whether or not the second engagement clutch C2 has reached the "Left" position, that is, a position that establishes the "MG2 start mode." As long as it is determined that the second engagement clutch C2 has not reached the "Left" position, the steps of Step S312→Step S313 are repeated, and the output of the second motor/generator MG2 for starting the vehicle is limited, regardless of the required driving force from the driver. In other words, the control to switch the second engagement clutch C2 to the "Left" position is prioritized over the starting control. At this time, the first engagement clutch C1 is switched to the "N" position.

When it is determined that the second engagement clutch C2 has reached the "Left" position, the steps proceed to Step S314, and the output of the second motor/generator MG2 is normally controlled according to the required driving force from the driver.

In this manner, in the embodiment, when a vehicle carries out an EV start by an output of the first motor/generator MG1 from a state in which the third engagement clutch C3 is in the "N" position or the "Right" position, the output of the first motor/generator MG1 is limited until the third engagement clutch C3 is switched to the "Left" position of the starting time. More specifically, the output of the first motor/generator MG1 is limited such that the input-output differential rotation speed of the third engagement clutch C3 becomes less than or equal to a predetermined rotational speed at which the opposing dog teeth 53a, 56a can be meshing engaged, until the third engagement clutch C3 is switched to the "Left" position. Additionally, when a vehicle is started from a state in which the third engagement clutch C3 is stuck in the "N" position, the "second starting mode" in which an EV start is carried out by the second motor/generator MG2 is selected. At this time, the output of the second motor/generator MG2 is limited until the second engagement clutch C2 is switched to the "Left" position of the starting time. More specifically, the output of the second motor/generator MG2 is limited such that the input-output differential rotation speed of the second engagement clutch C2 becomes less than or equal to a predetermined rotational speed at which the opposing dog teeth 52b, 58b can be meshing engaged, until the second engagement clutch C2 is switched to the "Left" position.

Action of the Starting Control

Figure 9:
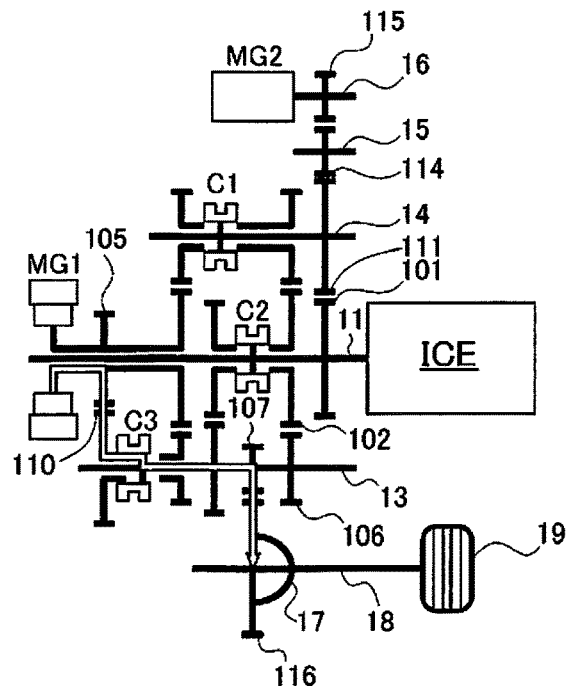
FIG. 9 is a torque flow diagram illustrating the flow of the MG1 torque in a multistage gear transmission when the "EV1st ICE-" gear shift pattern is selected.
Figure 10:
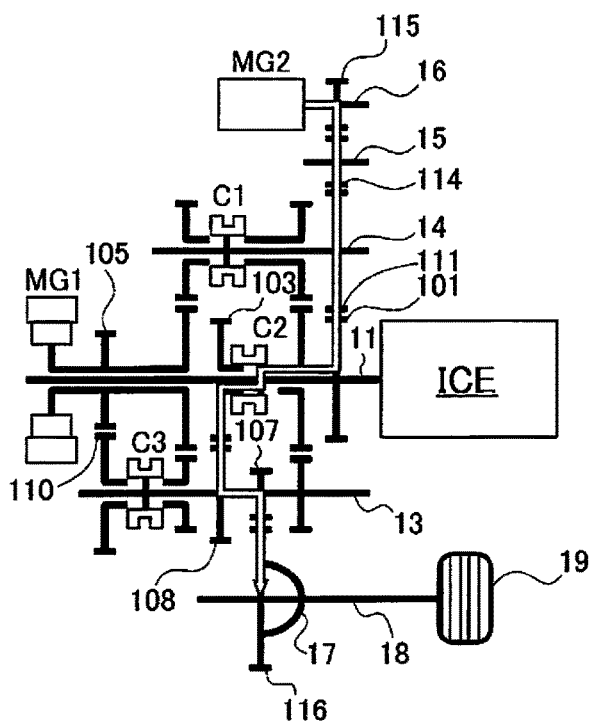
FIG. 10 is a torque flow diagram illustrating the flow of the MG2 torque in a multistage gear transmission when the "MG2 start" gear shift pattern is selected.

The action of the starting control will be described based on FIGS. 9 to 11.

First, the flow of the MG1 torque in the multistage gear transmission 1 when the "EV1st" gear shift pattern is selected will be described based on FIG. 9. In the "EV1st" gear shift pattern, the first engagement clutch C1 is in the "N" position, the second engagement clutch C2 is in the "N" position, and the third engagement clutch C3 is in the "Left" position. Therefore, the MG1 torque flows from the first motor/generator MG1 to the second shaft 12→the fifth gear 105→the tenth gear 110 the third shaft 13→the seventh gear 107→the sixteenth gear 116→the differential gear 17→the drive shaft 18→the drive wheels 19.

Next, the flow of the MG2 torque in the multistage gear transmission 1 when the "MG2 start mode" gear shift pattern is selected will be described based on FIG. 10. In the "MG2 start mode" gear shift pattern, the first engagement clutch C1 is in the "N" position, the second engagement clutch C2 is in the "Left" position, and the third engagement clutch C3 is in the "N" position. Therefore, the MG2 torque flows from the second motor/generator MG2 to the sixth shaft 16→fifteenth gear 115→fourteenth gear 114→eleventh gear 111→first gear 101→first shaft 11→third gear 103→eighth gear 108→third shaft 13→seventh gear 107→sixteenth gear 116→differential gear 17→drive shaft 18→drive wheels 19.

In addition, the action of the starting control process described with reference to FIG. 8 will be described based on the timing chart of FIG. 11.

The vehicle is decelerated, and the EV gear shift stage is downshifted from time t1 to time t2. After the vehicle is stopped at time t3, a non-travel range (P, N) is selected by the driver at time t4. Thus, the third engagement clutch C3 is released at time t5 to disconnect the first motor/generator MG1 and the drive wheels 19. When the third engagement clutch C3 is released and the EV gear shift stage becomes N (Neutral) at time t6, the first engagement clutch C1 is switched to the "Left" position according to an idle power generation request, and the internal combustion engine ICE and the first motor/generator MG1 are connected. When the first engagement clutch C1 reaches the "Left" position at time t7, idle power generation is executed.

When idle power generation is ended, the first engagement clutch C1 is switched to the "N" position at time t8. In this embodiment, as illustrated in the gear shift pattern of FIG. 4, since the first engagement clutch C1 is in the "N" position in all starting modes (EV1st, EV2nd, MG2 start mode), the first engagement clutch C1 is set to be switched to the "N" position when the idle power generation is completed.

When a travel range (D, R, etc.) is selected by the driver at time t9, the third engagement clutch C3 is switched from the "N" position to the "Left" position between time t10 and time t11. At this time, the rotational speed of the first motor/generator MG1 is maintained at a low speed due to the output of the first motor/generator MG1 being limited. When the third engagement clutch C3 is switched to the "Left" position and EV1st is established at time t11, the output limitation of the first motor/generator MG1 is canceled, the output is controlled according to the required driving force as usual, and the vehicle begins to move.

Characteristic Action of the Starting Control

Figure 11:
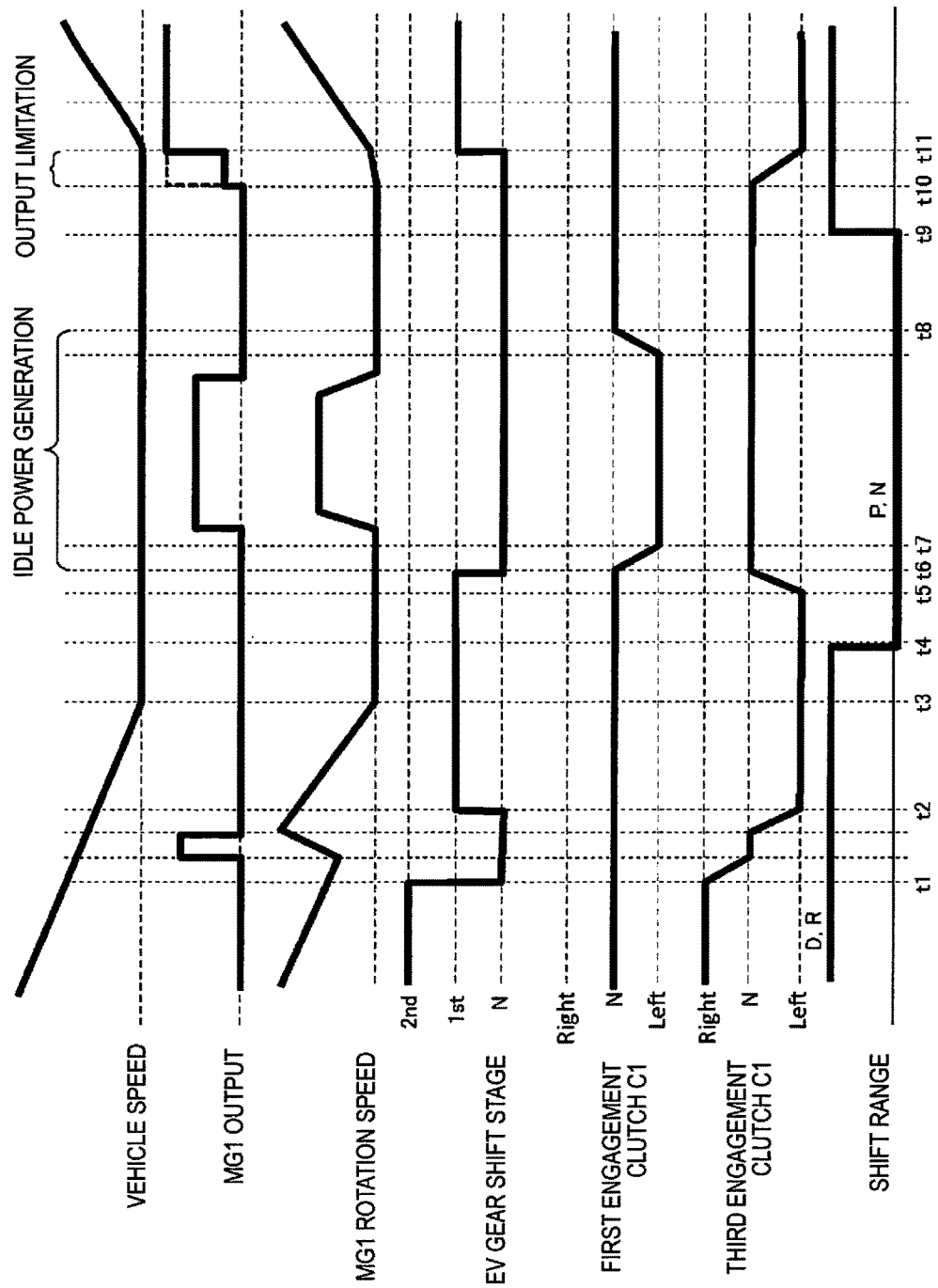
FIG. 11 is a timing chart illustrating each characteristic at the time of execution of the flowchart of FIG. 8.

As described above, the present embodiment is configured to limit the output of the first motor/generator MG1 until the third engagement clutch C3 comes into an engaged state, in which the transmission of drive power is possible, at the time of start from a released state of the third engagement clutch C3 (time t10-t11 in FIG. 11). More specifically, the output of the first motor/generator MG1 is limited such that the input-output differential rotation speed of the third engagement clutch C3 becomes less than or equal to a predetermined rotational speed at which the opposing dog teeth 53a, 56a can be meshing engaged, until the third engagement clutch C3 is switched to the "Left" position. That is, in a dog clutch, if the tips of the dog teeth (meshing teeth) are in phase, the dog teeth will collide with each other; therefore, there are cases in which the starting dog clutch (third engagement clutch C3) cannot be engaged at the time of a start of the vehicle. Then, if the output of the first motor/generator MG1 is controlled according to the required driving force while the third engagement clutch C3 remains in the released state, the rotational speed of the dog teeth that should be engaged with the third engagement clutch C3 at the time of a start (more precisely, the dog teeth 56a of the left dog clutch ring 56 that should be engaged with the dog teeth 53a of the coupling sleeve 53 of the third engagement clutch C3) will suddenly increase. Consequently, the dog teeth 53a, 56a cannot be meshed, even when attempting to switch the third engagement clutch from the "N" position to the engagement position "Left." Then, the rotation of the first motor/generator MG1 is abruptly increased, and it becomes necessary to repeat the shifting operation, creating the risk of a delay of the vehicle starting. In contrast, it is possible to prevent an abrupt increase in the rotation of the first motor/generator MG1 by limiting the output of the first motor/generator MG1 until the third engagement clutch C3 comes into a meshed state, in which the transmission of drive power is possible. In addition, since the dog teeth 53a, 56a to be engaged with the third engagement clutch C3 are rotated at a low speed by the first motor/generator MG1, whose output is limited, it is possible to avoid a situation in which the gears cannot be engaged due to the dog teeth to be engaged being in phase. Therefore, it is possible to avoid repeating the shifting operation, and to complete the starting operation of the vehicle at an early stage.

The embodiment is configured to limit the output of the electric motor at the time of an EV start with the shift range of the vehicle being operated from a non-traveling range to a traveling range, when the vehicle is stopped (time t4-t11 in FIG. 11). That is, the present embodiment is configured to switch all of the first, second, and third engagement clutches C1, C2, C3 to the "N" position when a non-travel range (P, N) is selected by the driver. Thus, once a non-travel range is selected when the vehicle is stopped, it is necessary to switch the third engagement clutch C3 from the "N" position to the "Left" position at the time of a restart. If the output of the first motor/generator MG1 is controlled according to the required driving force before the switching of the third engagement clutch C3 to the "Left" position is completed, there is the risk that the rotation of the first motor/generator MG1 will be abruptly increased. Therefore, by limiting the output of the first motor/generator MG1 at the time of an EV start with the shift range being operated from a non-travel range to a traveling range, it is possible to prevent racing of the first motor/generator MG1, even in the state described above.

The embodiment is configured to limit the output of the first motor/generator MG1, at the time of an EV start after releasing the third engagement clutch C3 and carrying out idle power generation, after the vehicle is stopped (time t7-t11 in FIG. 11). That is, since it is necessary to release the third engagement clutch C3 during idle power generation, there are cases in which the third engagement clutch C3 is not in a meshed state that is capable of transmitting the drive force, at the time of a restart after the execution of idle power generation. Therefore, the output of the first motor/generator MG1 is limited at the time of a restart after idle power generation, so as to prevent racing of the first motor/generator MG1 caused by the inability to engage the third engagement clutch C3.

The embodiment is configured to limit the output of the first motor/generator MG1, when the third engagement clutch C3 is engaged with a gear shift stage (EV2nd, N) other than the starting gear shift stage (EV1st) of the vehicle, when the vehicle is started. That is, in the present embodiment, since the multistage gear transmission 1 does not have a differential rotation absorbing element, the vehicle carries out an EV start in EV1st, which is the first speed of the EV gear shift stage. Thus, when the third engagement clutch C3 is engaged with a gear shift stage other than EV1st at the time of a start (in other words, if the third engagement clutch C3 is in a position other than the "Left" position), it is necessary to switch the third engagement clutch C3 to the "Left" position. Therefore, the output of the first motor/generator MG1 is limited even in such cases, so that racing of the first motor/generator MG1 can be prevented.

The embodiment is configured to limit the output of the first motor/generator MG1 if the vehicle is started when the third engagement clutch C3 is in the "N" position, due to a delay in the EV downshift. That is, if the rate of deceleration of the vehicle is high, there are cases in which there is not enough time for the EV downshift, and the vehicle stops before EV1st for vehicle starting is established. Therefore, the output of the first motor/generator MG1 is limited even in such cases, so that racing of the first motor/generator MG1 can be prevented.

The embodiment is configured to start the vehicle in the "MG2 start mode" (abnormality EV start mode) if the third engagement clutch C3 is stuck in the "N" position, or if an abnormality is detected in the first motor/generator MG1, in that case, to limit the output of the second motor/generator MG2 until the second engagement clutch (abnormality starting dog clutch) C2 comes into a meshed state, in which the transmission of drive power is possible. That is, if the third engagement clutch C3 is stuck in the "N" position, or if an abnormality is detected in the first motor/generator MG1, the normal starting gear shift stage (EV1st) cannot be established. Therefore, in such cases, the second motor/generator MG2 is used as the starting motor instead of the first motor/generator MG1. Thus, the second engagement clutch C2 functions as the starting dog clutch (abnormality starting dog clutch) instead of the third engagement clutch C3. Therefore, the output of the second motor/generator MG2 is limited when using the second motor/generator MG2 as the starting motor, such that the second engagement clutch C2 can be reliably and smoothly switched to a meshed state, in which the transmission of drive power is possible. It is thereby possible to prevent racing of the second motor/generator MG2, which acts as the starting motor.

Next, the effects are described. The effects listed below can be obtained by the starting control device for a hybrid vehicle according to the embodiment.

(1) In an electrically driven vehicle comprising an electric motor (first motor/generator MG1) as a drive source and a transmission (multistage gear transmission 1) that is configured to shift and transmit an output of the electric motor (first motor/generator MG1) to a drive wheel 19, and the transmission (multistage gear transmission 1) has a starting dog clutch (third engagement clutch C3) that is meshing engaged due to a stroke from a disengaged position, a starting controller (transmission control unit 23) is provided, which carries out an EV start by transmitting the output of the electric motor (first motor/generator MG1) to the drive wheel 19 via the starting dog clutch (third engagement clutch C3), based on a starting request, and the starting controller (transmission control unit 23) limits an output of the electric motor (first motor/generator MG1) at the time of an EV start from a released state of the starting dog clutch (third engagement clutch C3), until the starting dog clutch (third engagement clutch C3) is brought into a meshed state that transmission is configured transmit drive power (FIG. 8, S305-S306). It is thereby possible to prevent an abrupt increase in the rotation of the first motor/generator MG1. It is also possible to avoid a situation in which the gears cannot be engaged due to the phases of the dog teeth to be engaged being matched. Therefore, it is possible to avoid a redoing of the shifting operation, and to complete the starting operation of the vehicle at an early stage.

(2) The starting controller (transmission control unit 23) limits the output of the electric motor (first motor/generator MG1) at the time of an EV start from a released state of the starting dog clutch (third engagement clutch C3), such that an input-output differential rotation speed of the starting dog clutch (third engagement clutch C3) becomes less than or equal to a predetermined rotational speed at which the starting dog clutch (third engagement clutch C3) can be meshing engaged (FIG. 8, S305-S306). Thus, in addition to the effect of (1), it is possible to reliably and smoothly bring the third engagement clutch C3 into a meshed state, in which the transmission of drive power is possible, before starting the vehicle by the output of the first motor/generator MG1.

(3) The starting controller (transmission control unit 23) releases the starting dog clutch (third engagement clutch C3) by a shift range of the vehicle being operated to a non-traveling range (P, N) when the vehicle is stopped (FIG. 7, S201), and the output of the electric motor (first motor/ generator MG1) is limited at the time of an EV start when the shift range is operated from the non-traveling range (P, N) to a traveling range (D, R, etc.), while the starting dog clutch (third engagement clutch C3) remains in the released state (FIG. 8, S305-S306). Thus, in addition to the effects of (1), (2), it is possible to prevent an abrupt increase in the rotation of the first motor/generator MG1, even when carrying out an EV start with the shift range being operated from a non-traveling range to a traveling range.

(4) An internal combustion engine ICE is further provided as the power source, and the starting controller (transmission control unit 23) limits the output of the electric motor (first motor/generator MG1) (FIG. 8, S305-S306) at the time of the EV start from a released state of the starting dog clutch (third engagement clutch C3), after the starting dog clutch (third engagement clutch C3) is released after the vehicle is stopped, and idle power generation for generating power is carried out by driving an electric motor (first motor/generator MG1) by the internal combustion engine ICE (FIG. 7, S202-S204). Thus, in addition to the effects of (1) to (3), it is possible to prevent racing of the first motor/generator MG1 caused by the inability to engage the third engagement clutch C3, even at the time of a restart after idle power generation.

(5) The starting controller (transmission control unit 23) limits the output of the electric motor (first motor/generator MG1) (FIG. 8, S303-S306), when the starting dog clutch (third engagement clutch C3) is engaged with a gear shift stage (EV2nd, N) other than a starting gear shift stage (EV1st) of the vehicle, at the time of an EV start of the vehicle. Thus, in addition to the effects of (1) to (4), it is possible to prevent racing of the first motor/generator MG1, even when restarting the vehicle from a state in which the third engagement clutch C3 is engaged with a gear shift stage other than the starting gear shift stage.

(6) The starting controller (transmission control unit 23) limits the output of the electric motor (first motor/generator MG1) (FIG. 6, S101-S103, FIG. 8, S303-S306) when starting the vehicle from a released state of the starting dog clutch (third engagement clutch C3), due to a delay in an EV downshift at the time of deceleration before the vehicle is stopped. Thus, it is possible to prevent racing of the first motor/generator MG1, even when the rate of deceleration of the vehicle is high and the vehicle stops before establishing EV1st.

(7) the electric motor (first motor/generator MG1) corresponds to a first electric motor, and a second electric motor (second motor/generator MG2) is further provided as the power source, the starting controller (transmission control unit 23) has an abnormality EV start mode (MG2 start mode) for starting the vehicle by transmitting an output of the second electric motor (second motor/generator MG2) to the drive wheels 19 via an abnormality starting dog clutch (second engagement clutch C2), if the starting dog clutch (third engagement clutch C3) is stuck in a released state, or if an abnormality is detected in the first electric motor (first motor/generator MG1), and the output of the second electric motor (second motor/generator MG2) is limited when starting in the abnormality EV start mode (MG2 start mode) until the abnormality starting dog clutch (second engagement clutch C2) comes into a meshed state in which the transmission of drive power is possible (FIG. 8, S302-S313). Thus, the second motor/generator MG2 can be used as the starting motor instead of the first motor/generator MG1, even if the normal starting gear shift stage (EV1st) cannot be established. In addition, it is possible to reliably and smoothly switch the second engagement clutch C2, which becomes the starting engagement clutch in such cases, to a meshed state in which the transmission of drive power is possible, and to prevent racing of the second motor/generator MG2.

The starting control device for an electrically driven vehicle of the present invention was described above based on the embodiment, but specific configurations thereof are not limited to this embodiment, and various modifications and additions to the present invention can be made without departing from the scope of the invention according to each claim in the Claims.

In the embodiment, an example was shown in which the starting control device of the present invention is applied to an electrically driven vehicle. However, the starting control device of the present invention can be applied to any vehicle that can be started using a motor as a drive source, and can also be applied to a series hybrid vehicle.

In the embodiment, an example was shown in which an engagement of the second and third engagement clutches C2, C3 is determined on the basis of an output of a stroke sensor. However, it is sufficient if it can be detected that the second and third engagement clutches C2, C3 are engaged; for example, an engagement may be determined based on the output of a touch sensor.

In the embodiment, an example was shown in which all of the first, second, and third engagement clutches C1, C2, C3 are switched to the "N" position when a non-travel range (P, N) is selected. However, the invention may be configured to maintain the established gear shift stage even when a non-travel range (P, N) is selected. However, even with this configuration, the second and third engagement clutches C2, C3 are released if there is an idle power generation request, so as to prevent the vehicle from unintentionally starting to move while executing idle power generation.

In the embodiment, an example was shown in which is applied a multistage gear transmission 1 comprising EV first to second speeds as EV gear shift stages and ICE first to fourth speeds as ICE gear shift stages. However, the starting control device of the present invention can be applied to any vehicle that can be started using a motor as a drive source, and the configuration of the multistage gear transmission is not limited to the embodiment.

The invention claimed is:

1. A starting control device for an electrically driven vehicle having an electric motor and an internal combustion engine as drive sources and a transmission that is configured to shift and transmit an output of at least one of the internal combustion engine and the electric motor to a drive wheel, the transmission does not have a differential rotation absorbing element between the internal combustion engine and the drive wheel, and having a starting dog clutch that is meshing engaged due to a stroke from a disengaged position, the starting control device comprising:

a starting controller that carries out an EV start by transmitting the output of the electric motor to the drive wheel via the starting dog clutch based on a starting request, the starting controller being configured to limit an increase in the output of the electric motor at a time of an EV start from a released state of the starting dog clutch until the starting dog clutch is brought into a meshed state that the transmission is configured to transmit drive power more as compared with when an EV start is carried out from an engaged state of the starting dog clutch.

2. The starting control device as recited in claim 1, wherein the starting controller limits the increase in the output of the electric motor at the time of an EV start from a released state of the starting dog clutch, such that an input-output differential rotation speed of the starting dog clutch becomes less than or equal to a predetermined rotational speed at which the starting dog clutch can be meshing engaged.

3. The starting control device as recited in claim 1, wherein
the starting controller releases the starting dog clutch by a shift range of the vehicle being operated to a non-travel range when the vehicle is stopped, and
the starting controller limits the increase in the output of the electric motor at the time of the EV start when the shift range is operated from the non-travel range to a travel range, while the starting dog clutch remains in the released state.

4. The starting control device as recited in claim 1, wherein
the starting controller limits the increase in the output of the electric motor at the time of the EV start from a released state of the starting dog clutch, after the starting dog clutch is released after the vehicle is stopped, and idle power generation for generating power is carried out by driving the electric motor with the internal combustion engine.

5. The starting control device as recited in claim 1, wherein
the starting controller limits the increase in the output of the electric motor, when the starting dog clutch is engaged with a gear shift stage other than a starting gear shift stage of the vehicle, at the time of an EV start of the vehicle.

6. The starting control device as recited in claim 1, wherein
the starting controller limits the increase in the output of the electric motor when starting the vehicle from a released state of the starting dog clutch, due to a delay in an EV downshift at the time of deceleration before the vehicle is stopped.

7. The starting control device as recited in claim 1, wherein
the electric motor corresponds to a first electric motor, and a second electric motor is further provided as a power source,
the starting controller has an abnormality EV start mode for starting the vehicle by transmitting an output of the second electric motor to the drive wheels via an abnormality starting dog clutch, if the starting dog clutch is stuck in a released state, or if an abnormality is detected in the first electric motor, and
the starting controller limits the increase in the output of the second electric motor when starting in the abnormality EV start mode until the abnormality starting dog clutch comes into a meshed state in which the transmission is configured to transmit drive power.

8. The starting control device as recited in claim 2, wherein
the starting controller releases the starting dog clutch by a shift range of the vehicle being operated to a non-travel range when the vehicle is stopped, and
the starting controller limits the increase in the output of the electric motor at the time of the EV start when the shift range is operated from the non-travel range to a travel range, while the starting dog clutch remains in the released state.

9. The starting control device as recited in claim 2, wherein
the starting controller limits the increase in the output of the electric motor at the time of the EV start from a released state of the starting dog clutch, after the starting dog clutch is released after the vehicle is stopped, and idle power generation for generating power is carried out by driving the electric motor with the internal combustion engine.

10. The starting control device as recited in claim 2, wherein
the starting controller limits the increase in the output of the electric motor, when the starting dog clutch is engaged with a gear shift stage other than a starting gear shift stage of the vehicle, at the time of an EV start of the vehicle.

11. The starting control device as recited in claim 2, wherein
the starting controller limits the increase in the output of the electric motor when starting the vehicle from a released state of the starting dog clutch, due to a delay in an EV downshift at the time of deceleration before the vehicle is stopped.

12. The starting control device as recited in claim 2, wherein
the electric motor corresponds to a first electric motor, and a second electric motor is further provided as a power source,
the starting controller has an abnormality EV start mode for starting the vehicle by transmitting an output of the second electric motor to the drive wheels via an abnormality starting dog clutch, if the starting dog clutch is stuck in a released state, or if an abnormality is detected in the first electric motor, and
the starting controller limits the increase in the output of the second electric motor when starting in the abnormality EV start mode until the abnormality starting dog clutch comes into a meshed state in which the transmission is configured to transmit drive power.

13. The starting control device as recited in claim 3, wherein
the starting controller limits the increase in the output of the electric motor at the time of the EV start from a released state of the starting dog clutch, after the starting dog clutch is released after the vehicle is stopped, and idle power generation for generating power is carried out by driving the electric motor with the internal combustion engine.

14. The starting control device as recited in claim 3, wherein
the starting controller limits the increase in the output of the electric motor, when the starting dog clutch is engaged with a gear shift stage other than a starting gear shift stage of the vehicle, at the time of an EV start of the vehicle.

15. The starting control device as recited in claim 3, wherein
the starting controller limits the increase in the output of the electric motor when starting the vehicle from a released state of the starting dog clutch, due to a delay in an EV downshift at the time of deceleration before the vehicle is stopped.

16. The starting control device as recited in claim 3, wherein
the electric motor corresponds to a first electric motor, and a second electric motor is further provided as a power source, the starting controller has an abnormality EV start mode for starting the vehicle by transmitting an output of the second electric motor to the drive wheels via an abnormality starting dog clutch, if the starting dog clutch is stuck in a released state, or if an abnormality is detected in the first electric motor, and the starting controller limits the increase in the output of the second electric motor when starting in the abnormality EV start mode until the abnormality starting dog clutch comes into a meshed state in which the transmission is configured to transmit drive power.

17. The starting control device as recited in claim 4, wherein the starting controller limits the increase in the output of the electric motor, when the starting dog clutch is engaged with a gear shift stage other than a starting gear shift stage of the vehicle, at the time of an EV start of the vehicle.

18. The starting control device as recited in claim 4, wherein the starting controller limits the increase in the output of the electric motor when starting the vehicle from a released state of the starting dog clutch, due to a delay in an EV downshift at the time of deceleration before the vehicle is stopped.

19. The starting control device as recited in claim 4, wherein the electric motor corresponds to a first electric motor, and a second electric motor is further provided as a power source, the starting controller has an abnormality EV start mode for starting the vehicle by transmitting an output of the second electric motor to the drive wheels via an abnormality starting dog clutch, if the starting dog clutch is stuck in a released state, or if an abnormality is detected in the first electric motor, and the starting controller limits the increase in the output of the second electric motor when starting in the abnormality EV start mode until the abnormality starting dog clutch comes into a meshed state in which the transmission is configured to transmit drive power.

* * * * *